United States Patent [19]

Berry

[11] Patent Number: 5,259,811
[45] Date of Patent: Nov. 9, 1993

[54] POULTRY-HANDLING ASSEMBLY

[75] Inventor: Paul S. Berry, Wootton, England

[73] Assignee: British Technology Group Ltd., London, England

[21] Appl. No.: 778,589

[22] Filed: Oct. 17, 1991

[30] Foreign Application Priority Data

Oct. 17, 1990 [GB] United Kingdom ............... 9022574
Mar. 27, 1991 [GB] United Kingdom ............... 9106534

[51] Int. Cl.$^5$ .................. A01K 29/00; A27C 21/02
[52] U.S. Cl. ................................ 452/183; 452/93; 119/847
[58] Field of Search ............... 452/183, 93; 119/82

[56] References Cited

U.S. PATENT DOCUMENTS

| 4,143,753 | 3/1979 | Bergens ................... 198/370 |
| 4,508,062 | 4/1985 | Berry et al. .............. 119/82 |
| 4,513,689 | 4/1985 | Berry et al. .............. 119/82 |
| 4,569,308 | 2/1986 | O'Neill et al. ............ 119/82 |
| 4,766,850 | 8/1988 | O'Neill ................... 119/82 |
| 4,900,292 | 2/1990 | Berry et al. .............. 452/93 |

FOREIGN PATENT DOCUMENTS 2128870 5/1984 United Kingdom .
2129393 5/1984 United Kingdom .
2205917 12/1988 United Kingdom .

*Primary Examiner*—Willis Little
*Attorney, Agent, or Firm*—Cushman, Darby & Cushman

[57] ABSTRACT

A poultry-handling assembly is provided which includes a pair of rotors arranged side-by-side for rotation about a vertical or predominantly vertical axis. Each rotor includes a central core upon which are arranged groups of guide elements spaced apart around the central core. In operation, the guide elements of each group lie closely adjacent and/or abut and/or intermesh with the guide elements of the other rotor of the pair. In operation a drive elements contra-rotate the two rotors enabling them to gather or accept poultry into the assembly.

31 Claims, 7 Drawing Sheets

POULTRY-HANDLING ASSEMBLY

The present invention relates to a poultry-handling assembly and to poultry harvesters using one or more such assemblies.

When poultry is harvested manually, apart from the high cost of labour involved, excessive bruising of the birds can often occur resulting in downgrading or sometimes the death of the birds in transit.

As an alternative to manual harvesting, UK Patent GB 2205917 B (National Research Development Corporation) discloses a poultry harvester using side-by-side pick-up rotors to provide a continuous array of radially extending guide elements which co-operate to gather up the birds and transmit them to a discharge location.

This arrangement works well with broilers when used on a sweep type harvester, although it is difficult to count the birds as they pass through the machine because of the numbers involved. However, when the same machine is used with turkeys, the birds seem to migrate away from the pick-up head as the brushing effect of the guide elements gives them warning of its approach. This results in a very low pick-up rate as the harvester has to chase after the migrating birds.

A poultry-handling assembly according to the present invention comprises a pair of rotors arranged side-by-side for rotation about vertical or predominantly vertical axes with each rotor providing guide elements arranged in groups which are spaced apart around the periphery of the rotor so that, in operation, the guide elements of each group lie closely adjacent and/or abut and/or intermesh with guide elements of the other rotor of the pair, and drive means for contra-rotating the two rotors to gather or accept poultry into the assembly.

Conveniently, the drive means function to rotate the rotors such that the guide elements "mesh" to form discrete compartments through which birds can be conveyed.

Preferably, in addition to the said pair of rotors, there is an end third rotor.

Conveniently, the paired rotors or, if more than two rotors are present, the pair of rotors responsible for discharging birds from the assembly, are interconnected by a common link shaft acting through right angle gears or the like.

Although poultry-handling assemblies constructed in accordance with the teachings of the present invention are especially suitable for use in harvesting turkeys, the scope of the invention is in no way limited to such assemblies but includes, as well, any poultry-harvesting assembly (whether capable of harvesting turkeys or not) having the features outlined above or in any of the following statements of invention.

Conveniently, where three rotors are present, then the configurations and relative positions of the rotors are such that in operation of the assembly they define a poultry input station, a poultry transfer station and a poultry discharge station.

Conveniently, in this latter case, the first pair of contra-rotating rotors defines the poultry input station, the second pair of contra-rotating rotors defines the poultry discharge station and, in passing from the input station to the discharge station, the poultry are temporarily located in a transfer station initially defined by the first pair of contra-rotating rotors, then by all three rotors together, and finally by the second pair of contra-rotating rotors.

Conveniently, in this case, the assembly includes stop control means operative to stop the three rotors at predetermined rotational positions in which guide elements of the rotors co-operate to present a continuous wall of elements thereby to maintain the correct inter-relationship between the three rotors when the assembly is restarted with the direction of motion of the end rotor reversed.

Conveniently, where the assembly is intended for use with birds in a certain size range e.g. turkeys, the assembly is so dimensioned that each poultry station is only able to hold one such bird at a time.

Conveniently, the guide elements are flexible fingers of the same or of the same general form as those disclosed in UK Patent GB 2205917 B (National Research Development Corporation) e.g. of the sort currently used for plucking the feathers from chicken carcasses.

Conveniently, the guide elements are arranged in what comprises a star-shaped configuration when the rotor is viewed along its axis of rotation.

Conveniently, in this latter case, guide elements of opposite sides of each group slant towards one another to produce the points of the star shape and a space between the points.

Conveniently, each group of elements comprises two or more (preferably three) rows of elements running lengthwise of the rotor.

Conveniently, each rotor has three or more groups of guide elements spaced circumferentially around the rotor, rotors with three, four, five or six groups of guide elements being currently preferred.

The invention also includes a poultry harvester incorporating a poultry-handling assembly according to the present invention.

Conveniently, in one such poultry harvester there is a conveyor for transferring birds from said poultry-handling assembly at the front end of the harvester to an end location at the back end of the harvester, and stationary side walls flanking both sides of the conveyor, the rotors adjacent to the conveyor at the front end of the harvester having their guide elements interdigitating with barrier means extending from the side walls to prevent birds from being pulled into the space between the front ends of the side walls and the adjacent rotors.

Conveniently, in one such case, the barrier means at least in part embrace the core portions of the adjacent rotors.

Preferably, in this last instance, the barrier means fully encircle the core portions of the adjacent rotors.

Conveniently, the barrier means are provided by metal and/or plastics and/or other suitable materials e.g. rubber loops extending around the adjacent rotor cores.

Conveniently, the harvester has one said poultry-handling assembly at the front end of the harvester and/or one said poultry-handling assembly at the back end of the harvester.

Conveniently, when a poultry-handling assembly is present at the back end of the harvester, as envisaged above, then barrier means may also be provided at the back end of the harvester so as to interdigitate with guide elements provided by the rotors of the poultry-handling assembly at the back end of the harvester. These latter barrier means may, if desired, have any of the optional features described above with respect to the barrier means at the front end of the assembly.

Embodiments of the invention will now be described, by way of example only, with reference to the accompanying drawings in which.

Figures 6A, 6B, 6C, 6D:
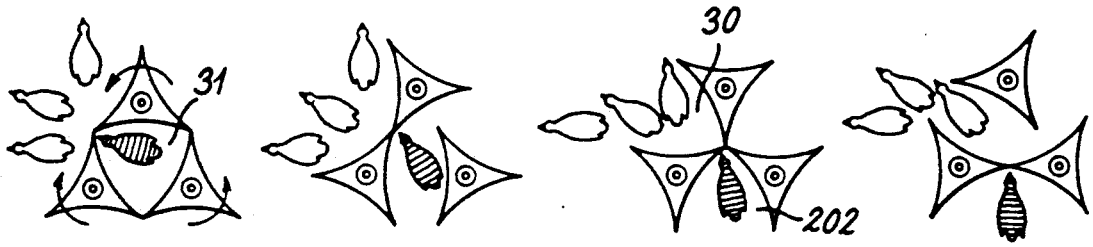

FIGS. 6(a-d), 7(a-c) and 8(a-c) are schematic plan views illustrating the operation of alternative designs of rotor assembly to that shown in FIGS. 1 to 5;

FIGS. 9 to 13 show diagrammatic plan views of further embodiments; and

Figure 14:
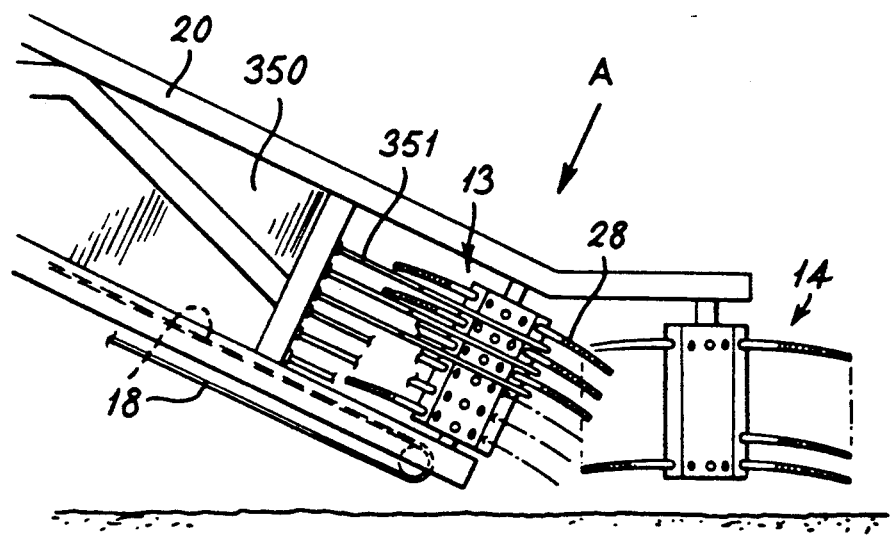
Figure 15:
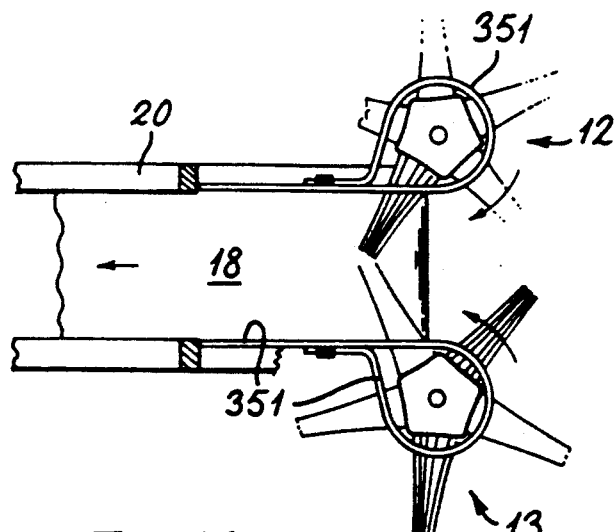

FIGS. 14 and 15 show one side view and one perspective view in the direction of the arrow A of a preferred form of the harvester front end.

Throughout the following description, the same reference numerals have been used to indicate structurally similar items where these appear in different illustrated embodiments.

Referring first to FIGS. 1 to 4 of the drawings, a mobile bird-harvester 10 in accordance with the present invention comprises three rotors 12,13,14 mounted in a triangular formation to provide a pick-up head 16 at the front end of the harvester.

Behind the pick-up head 16, is an angled upwardly moving conveyor belt 18. The support frame for belt 18 is provided by a scanning arm 20 the upper end of which is carried on a motorised turntable (not shown) pivotally mounted on the harvester chassis 22 to allow the arm to scan over an arc 23. Optionally, the lower end of arm 20 is carried on pivoting ground-support wheels (not shown).

At its upper end, the conveyor 18 discharges on to a second conveyor 24 at the rear end of which is a 3-rotor discharge assembly 26. The latter is of the same or essentially the same configuration and rotor design as pick-up head 16 except that the end rotor (114) now trails the other two rotors (112,113) and all three rotors rotate about vertical axes. This last requirement distinguishes the discharge assembly from the pick-up head 16 where only the end rotor 14 rotates about a vertical axis and the other two rotors 12,13 rotate about predominantly vertical upwardly and forwardly inclined axes lying perpendicular to the support surface of inclined belt 18.

The various rotors are driven by toothed belts or by individual electric motors (not shown). The rotor pairs 12,13 and 112,113 have fixed directions of rotation (respectively inwardly and outwardly of the associated belt 18,24). The end rotors 14,114 are able to change direction (as shown by the double-headed arrows) so as to rotate in a contrary rotational sense to a chosen rotor of the rotor pairs 12,13 and 112,113.

The harvester 10 can be driven either forward or backwards, the drives on the harvester being mechanical, electrical, hydraulic or pneumatic, or any combination of these, as convenient, with the prime mover carried on the chassis 22.

The scanning action of the arm 20 is effected by a reversible motor (not shown) and at the end of its scan, the arm will engage one or other of two contact switches which operate through a direction control unit to reverse the drives to the endmost rotor 14. The directions of rotation of the front rotor 14 and of the scanning arm 20 can be kept the same as one another throughout the harvesting operation by having the rotor control unit also in control of the scanning motion.

As an alternative (or in addition) to contact switches, a manual (override) control may be included for reversing the directions of scan and front rotor rotation.

Turning now to the rear end of the machine, the drive to the discharge rotor 114 is provided with a direction control unit (not shown) which determines the direction of rotation of this rotor at any given moment. Thus after a predetermined quantity of birds has passed along the conveyor 24, (e.g. as counted by an optical sensor located over the load-bearing top run of the conveyor), a signal from the sensor operates the direction control unit to reverse the rotational direction of the discharge rotor 114. This, in turn, switches the discharge of birds from one side of the machine to the other.

As an alternative (or in addition), a manual (override) control may be provided to activate the discharge direction control unit.

Each of the six rotors used in the pick-up head and the discharge assembly conveniently takes the form of a five-sided drum member 27 (see FIGS. 3 and 4) carrying an array of flexible rubber fingers 28. Typically the fingers will taper from an initial diameter of about 25 mm to a final diameter of about 12 mm at the tip. The overall finger length is typically about 235 mm giving rise to an overlap of about 50 mm at the position of maximum intermesh between the two rotors. The resilient nature of the finger material allows the fingers to be pushed into appropriate apertures in the respective drum members, a peripheral groove in the root portion of each finger ensuring that the finger locks securely into place in the drum aperture. The fingers are of the sort currently used for plucking chicken carcasses and further details may be had from UK Patents GB 2128870 B and GB 2205917 B (National Research Development Corporation).

Turning now to FIGS. 14 and 15 of the drawings, shown is a preferred design for the front end of the harvester in which the bottom ends of the side walls 350 to the conveyor 18 are fitted with plastic or metal extensions 351, which provide a comb structure encircling the core regions of the rotors 12,13 and interdigitating with the guide elements 28 on these rotors. The purpose of these extensions is to provide a barrier which removes any possibility of the birds being pulled between the ends of the side walls and the adjacent rotors rather than being successfully transferred from the pickup head on to the conveyor belt. In an alternative design (not shown), the extensions extend only part of the way around the two rotor cores adjacent to the conveyor 18. In a further alternative design (not shown) the extensions comprise a series of rigid comb teeth which extend to just short of the core or the rotor.

In operation, the broiler harvester 10 starts with the conveyors 18,24 running and the various rotors rotating in the senses described.

The pick-up head then scans through the birds with the front rotor 14 automatically rotating in the same direction as the direction of scan as hereinbefore described to lift the birds up from the litter and place them onto the conveyor 18. The birds are then carried along by the conveyor 18 until they are discharged onto the second conveyor 24, along which they continue to travel until they are removed by the discharge assembly 26 for packing into crates or modules (not shown) at the sides of the assembly.

Conveniently, as above described, the direction control for rotor 114 is either manually operated or is automatically operated once a predetermined quantity of birds has been discharged from the conveyor 24 (e.g. as detected by the optical sensor, if present).

The ability to discharge the birds to one or other side of belt 24 at will, allows the loaded crates on one side of the belt 24 to be replaced by empty crates while the discharge continues uninterrupted to the crates at the other side of belt 24.

When the scanning arm reaches the end of its travel, the direction of rotation of the rotor front 14 is automatically reversed e.g. by an appropriate one of the contact switches, and the harvester moves forward with the arm 20 scanning back in the reverse direction and the rotational sense of rotor 14 similarly reversed.

Conveniently, for example, in an electrical control system, the direction control units might comprise 3-way switches which can be activated (by the contact switches, the optical sensor, or by the equivalent manual controls, as the case may be) to reverse the polarity of their outputs to the reversible motors for the end rotors and the scanning arm.

Details of suitable drive and control systems for use in the harvester 10 are given in GB 2205917 B (National Research Development Corporation) to which reference should be made.

FIGS. 5(a) to 5(d) illustrate the different positions of the rotors 12,13,14 during pick-up and shows the function played by the input, transfer and discharge stations 30,31,32 during the passage of three birds through the pick-up head. The varying shapes of the three stations and the way in which they are defined will be clear from the drawings. If read in reverse order with the rotation directions of the rotors reversed, then these same Figures also illustrate what is happening at discharge assembly 26.

Figures 7A, 7B, 7C:
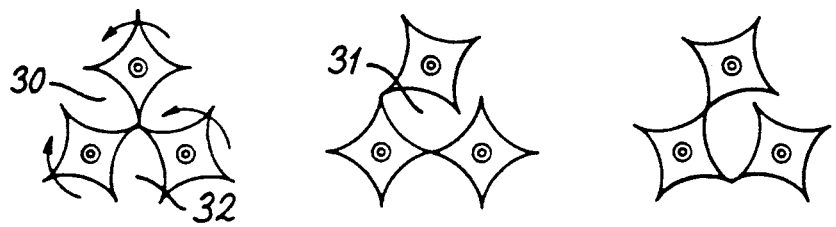
Figures 8A, 8B, 8C:
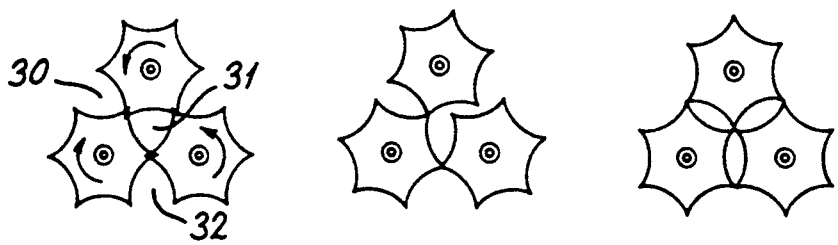

FIGS. 6,7,8 schematically illustrate the sequential rotor positions for pick-up rotors with three-pointed, four-points and six-pointed star configurations. In each case, the input, transfer and discharge stations have been indicated with the same reference numerals as in the previous embodiment. Apart from their differences in shape when viewed in plan, these alternative rotors will be of substantially the same construction as those shown in FIGS. 1 to 4 of the drawings.

If read in reverse order with the rotation directions of the rotors reversed, then (as was the case with FIG. 5), FIGS. 6,7,8 also illustrate what would happen if the new rotors were used at discharge assembly 26.

Figure 1:
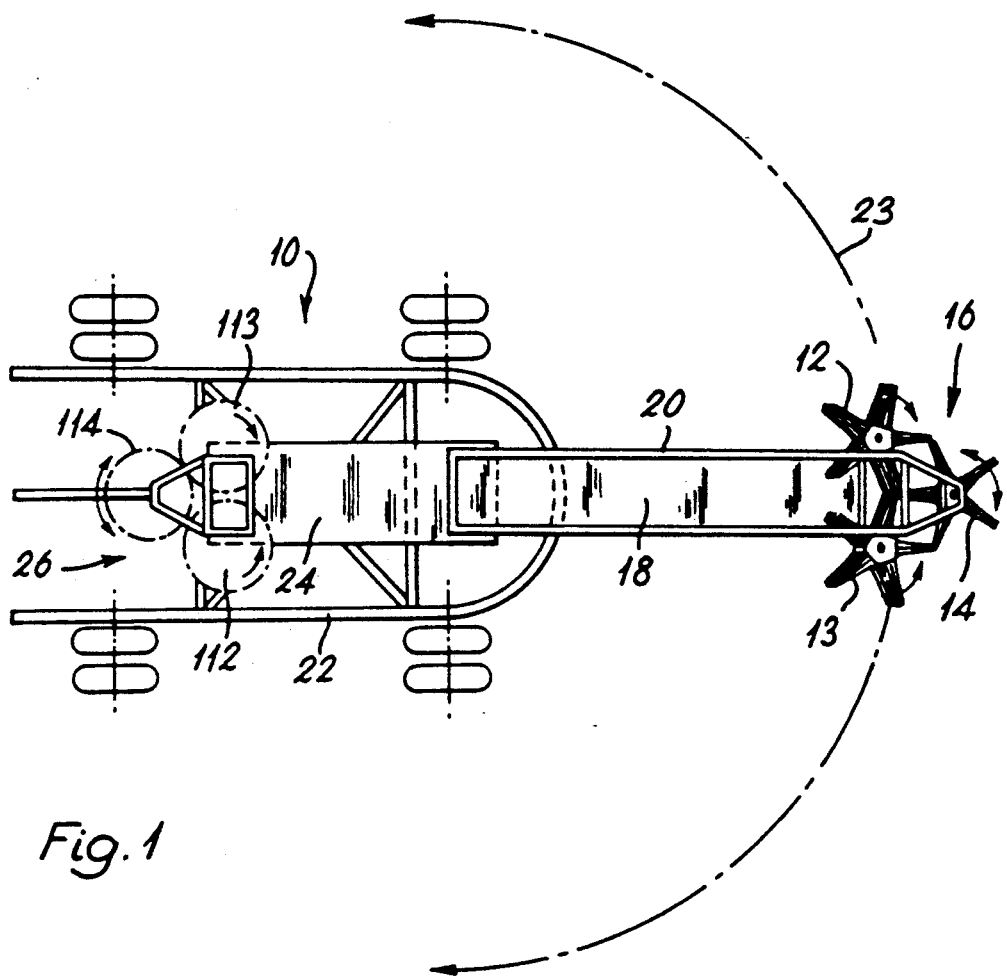
FIGS. 1 and 2 show schematic plan and side views of a turkey harvester according to the present invention.
Figure 2:
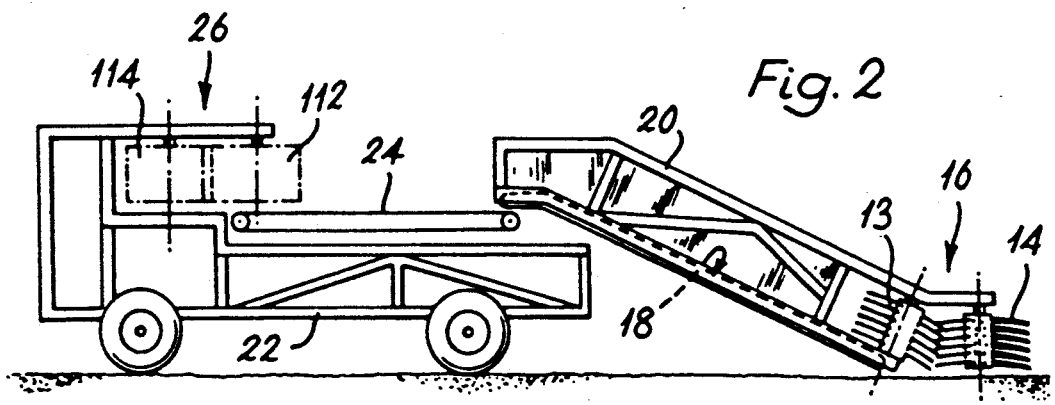
Figure 3:
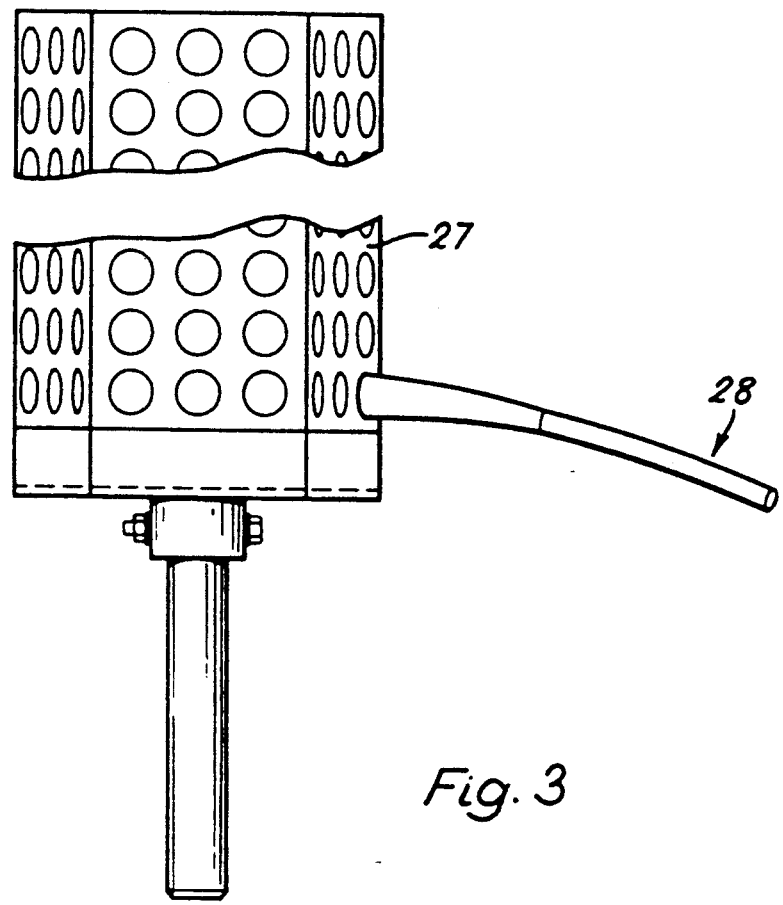
FIGS. 3 and 4 show side and plan views of one of the rotor drums with some of the guide elements also depicted.
Figure 4:
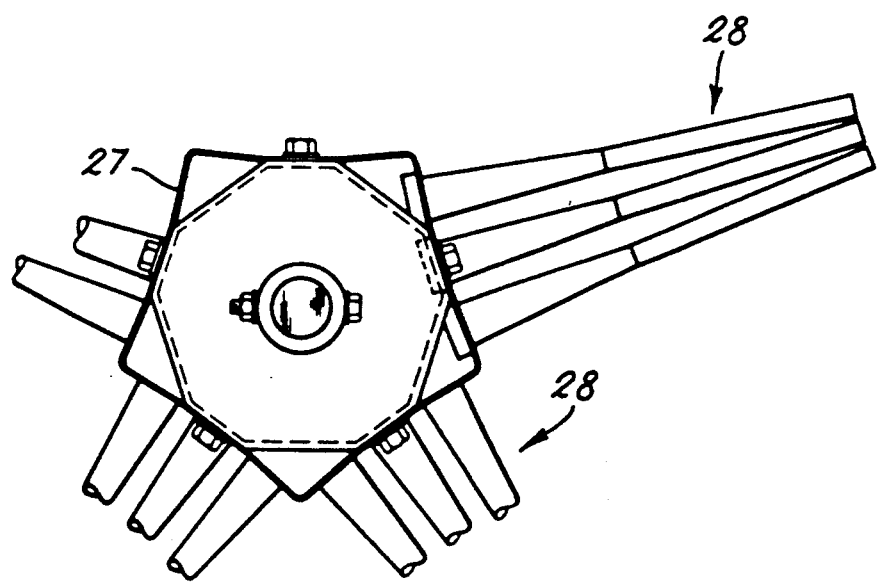
Figure 5A:
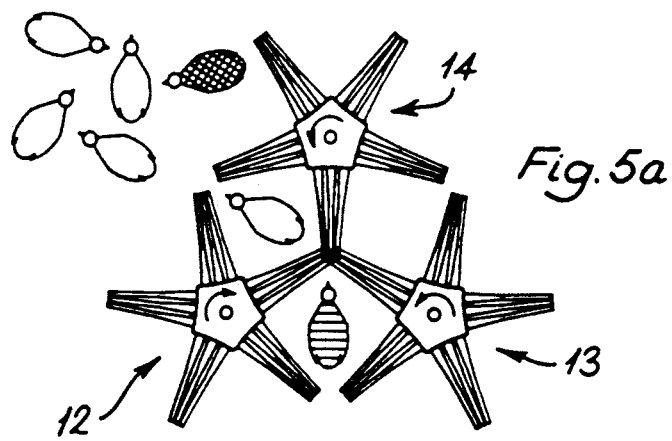
FIGS. 5a to 5d are partially schematic plan views showing the positions of the rotors at different stages of operation.
Figure 5B:
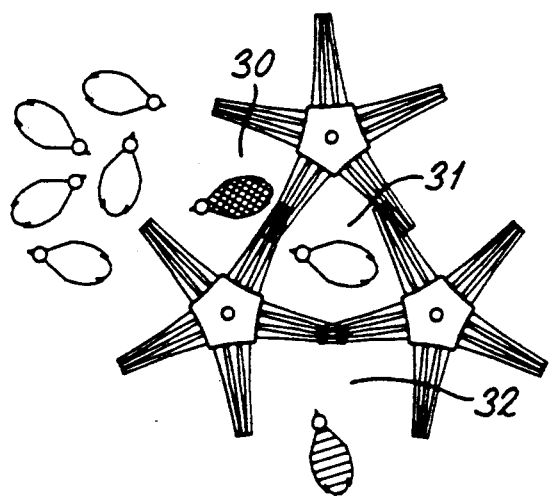
Figure 5C:
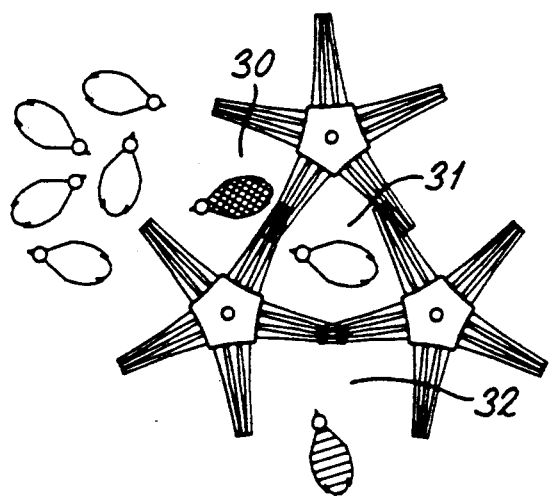
Figure 5D:
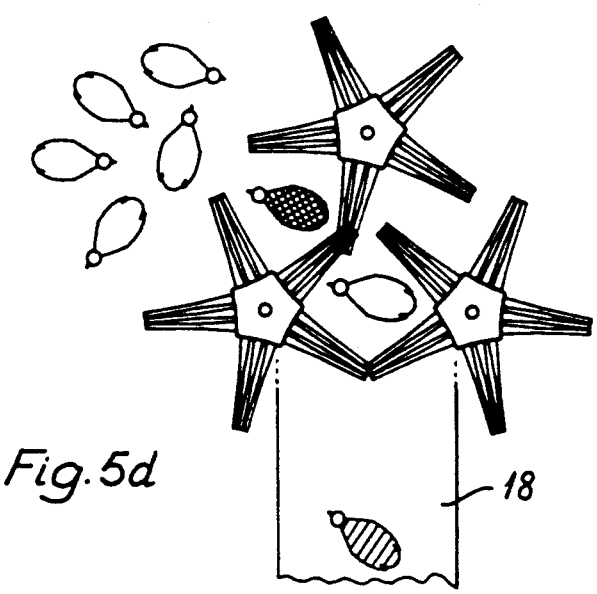

In an alternative embodiment (illustrated diagrammatically in FIG. 9), the end rotor 14 is omitted. In all other essential respects, the harvester can remain as illustrated in FIGS. 1 and 2 although rotor 114 can additionally be omitted from the discharge assembly 26 if this is thought to be desirable.

Figure 10:
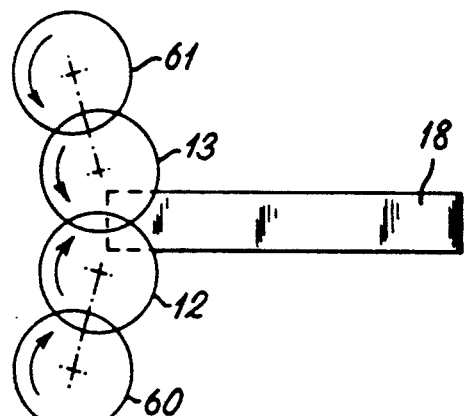

In other alternative embodiments, the harvester includes the use of four rotors side by side, the outer two of which serve to sweep birds in towards the two central rotors which lift the birds onto the conveyor. One such arrangement is shown in FIG. 10 where the sweeping rotors are identified by reference numerals 60,61 and no scanning facility is provided.

Figure 11:
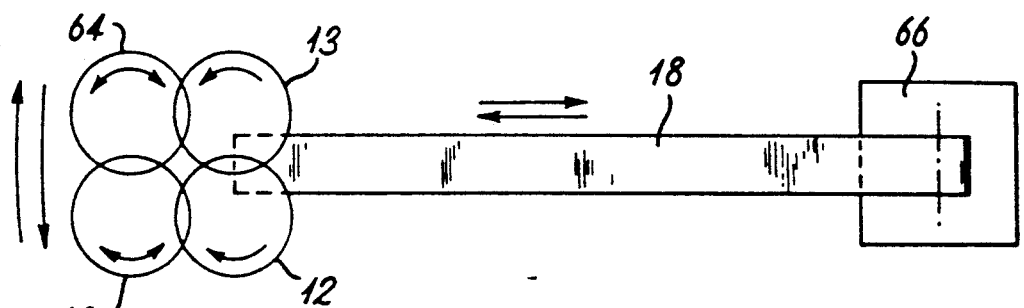
Figure 12:
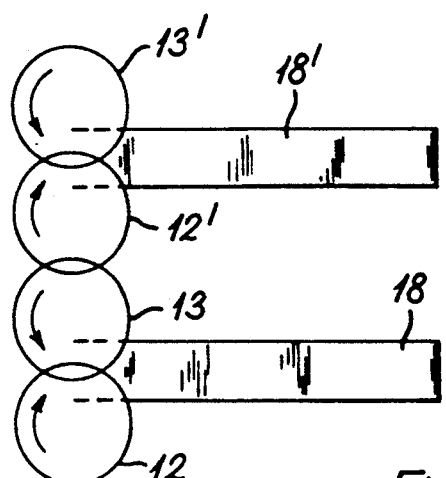

Another possible embodiment is the use of four rotors set in an approximately square formation (FIG. 11). The rear two rotors 12,13 lift birds up onto the conveyor 18 as described above. The direction of rotation of the front rotors 63,64 can be altered so that by sweeping the harvester from side to side birds can be picked up as well as by moving forward. In one such embodiment, the rearward end of the harvester might be pivoted at a point on the catching platform (66) and the conveyor made extendable so that the harvester could scan in an arc advancing slowly forward at the end of each sweep.

In yet another embodiment, a harvester with four rotors which scans linearly from side to side before advancing forward may be envisaged.

In a further embodiment (FIG. 12), a double headed harvester is envisaged, in which the rotors 12,13 and belt 18 of the earlier embodiments are duplicated at 12',13' and 18' respectively. As with the FIG. 9 embodiment, no scan facility is provided.

Figure 9:
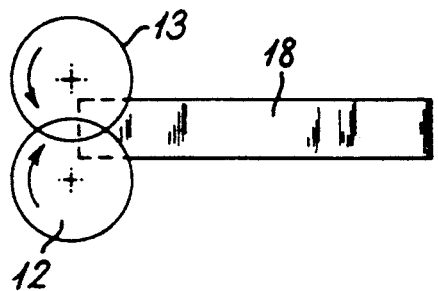

In variations (not shown) of the embodiments described with reference to FIG. 9 onwards, the five-pointed rotors 12,13,12',13' can be replaced by alternative designs of rotor according to the present invention e.g. those illustrated in FIGS. 6,7 and 8.

Figure 13:
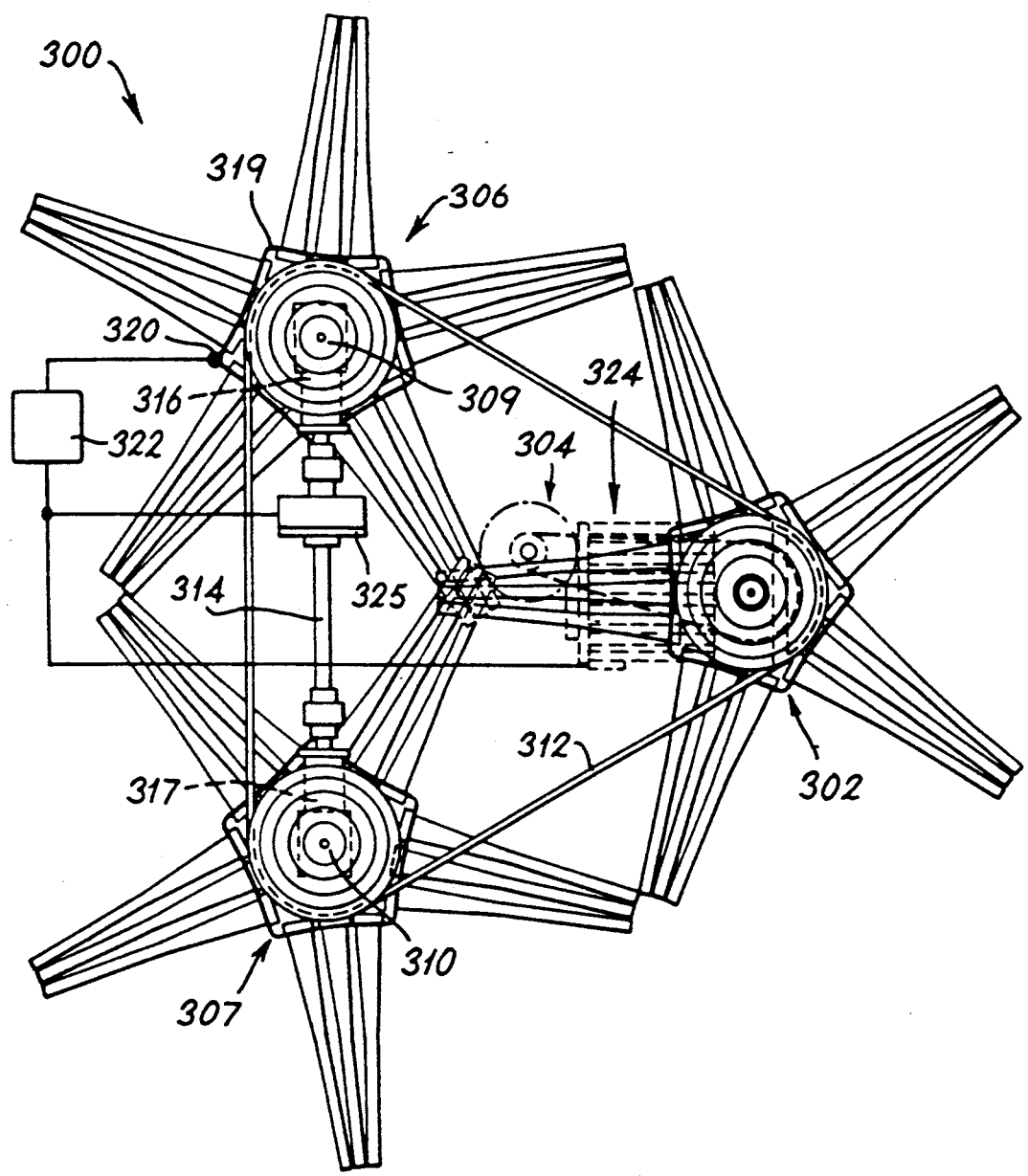

FIG. 13 of the drawings shows a partly schematic plan view of an embodiment of the poultry-handling assembly according to the present invention, wherein the rotor pairs are interconnected by a common link shaft. Thus a poultry-handling assembly 300 is shown including an end rotor 302 which may be driven in either direction by a reversible electric motor 304. The other two rotors 306,307, of the assembly are each alternately connectable with the end rotor 302 via oppositely-directed sprag clutches 309,310 driven by a toothed-belt and pulley drive 312 from rotor 302. In addition, the two rotors 306,307 are permanently interconnected via a common link shaft 314 acting through right-angle gearboxes 316,317 e.g. of the standard spiral bevel type.

In the above case, the adjacent bird-engaging sides of the paired rotors are required to move rearwardly irrespective of the direction of rotation of the associated end rotor. This result is achieved by mounting the sprag clutches so that each will engage only when the end rotor is rotating in the same rotational sense as that desired for the particular paired rotor under consideration. When the end rotor is rotating in the contrary sense to this, the associated sprag clutch will freewheel and the paired rotor concerned will instead be rotated in the desired direction by the inter-rotor link shaft.

Preferably, the motor and the link shaft are both "braked" i.e. they are provided with an electromagnetic brake which is automatically brought into action to stop the item dead at the appropriate moment.

It is a feature of this embodiment, that when the rotors stop, they should do so in the positions shown in the drawing to allow the rotors to stay "meshed" when reversed.

To enable this to happen, the end rotor of the three-rotor assembly carries a metal plate 319 which passes under a fixed proximity switch 320 once every revolution of the rotor. The pulse produced when this happens is fed to a control circuit 322 for the electromagnetic brakes (324,325) on the link and motor shafts. It is the first such pulse received by the control circuit after the motor has been turned off that is effective to de-energise these electromagnetic brakes to bring the link and motor shafts to an instant halt.

It will be clear that in all the embodiments above described, the rotors at the pick-up head 16 can be of a different design to those at the discharge assembly 26, if so desired.

The principal advantages of the pick-up assemblies of the present invention are that they stop the migration of the birds away from the pick-up head and that they have a separating effect as they place the birds on to the lift conveyor. The separating effect is useful as it makes it much easier to count the birds as they go through the machine.

In addition to their use in poultry harvesters, the various rotor arrays described in the application may have other uses either in the poultry field or in a completely different setting e.g. as part of a material handling apparatus. Thus according to another aspect of the present invention, an object-handling assembly comprises a pair of rotors arranged side-by-side for rotation about parallel or predominantly parallel axes with each rotor providing guide elements arranged in groups which are spaced apart around the periphery of the rotor so that, in operation, the guide elements of each group lie closely adjacent and/or abut and/or intermesh with guide elements of the other rotor of the pair, and drive means for contra-rotating the two rotors to gather or accept objects into the assembly.

The various optional features described above with reference to the poultry-handling assemblies of the present invention may also be used mutatis mutandis for the object-handling assembly of the invention.

It will be appreciated that when intended for objects other than poultry, an appropriate redimensioning of the illustrated rotors may be required and it may be necessary to use alternative types of guide elements more suited to the particular objects being conveyed.

I claim:

1. A poultry-handling assembly comprising:
first and second rotors arranged side by side mounted for rotation about generally vertical axes, each said rotor having guide elements disposed thereon, said guide elements being arranged in discrete groups spaced apart about the periphery of the rotor so as to define inter-group spaces between adjacent groups on the rotor, said inter-group spaces being larger than spaces defined between guide elements of each discrete group, and
drive means for contra-rotating said first and second rotors, whereby upon rotation of said first and second rotors, said guide elements cooperate to gather poultry into the assembly.

2. An assembly according to claim 1, wherein said drive means ensures that the guide elements mesh to form a discrete compartments defined by said inter-group spaces, poultry being conveyed in said compartments.

3. An assembly according to claim 2, further comprising a third rotor disposed forward said first and second rotors, said first, second and third rotors being arranged so as to define a poultry input station, a poultry transfer station and a poultry discharge station.

4. An assembly as claimed in claim 3, wherein said third rotor and one of said first and second rotors mesh to define said poultry input station, said first and second rotors mesh to define said poultry discharge station, and in passing from the input station to the discharge station, the poultry is temporarily located n the transfer station initially defined by said third rotor and one of said first and second rotor, then by all said rotors and then by said first and second rotors.

5. An assembly according to claim 4, further comprising stop control structure operative to stop the first, second and third rotors at predetermined rotational positions in which said guide element cooperate to define a continuous wall of elements to thereby maintain a correct interrelationship between the first, second and third rotors when the assembly is restarted with a direction of motion of the third rotor being reversed.

6. An assembly according to claim 1, wherein said guide elements are flexible fingers which project outwardly from said first and second rotors.

7. An assembly as claimed in claim 6 wherein the guide elements are arranged in a star-shaped configuration when the rotor is viewed along its axis of rotation.

8. An assembly as claimed in claim 7 wherein guide elements of opposite sides of each group slant towards one another to produce the points of the star shape and a space between the points.

9. An assembly as claimed in claim 7 wherein each group of elements comprises two or more rows of elements running lengthwise of the rotor.

10. An assembly as claimed in claim 9 wherein each group of elements consists of three said rows.

11. An assembly as claimed in claim 1 wherein each rotor has three or more groups of guide elements spaces circumferentially around the rotor.

12. A poultry harvester comprising:
a vehicle having a frame;
first and second rotors arranged side by side mounted on said frame for rotation about generally vertical axes, each said rotor having guide elements disposed thereon, said guide elements being arranged in discrete groups spaced apart about the periphery of the rotor so as to define inter-group spaces between adjacent groups on the rotor, said inter-group spaces being larger than spaces defined between guide elements of each discrete group, and
drive means for contra-rotating said first and second rotors, whereby upon rotation of said first and second rotors, said guide elements cooperate to gather poultry into the harvester.

13. A poultry harvester according to claim 12, further comprising a conveyor for transferring poultry from the poultry-handling assembly at a front end of the harvester to an end location at a back end of the harvester, and stationary side walls flanking both sides of said conveyor, the rotors adjacent to the conveyor at the front end of the harvester having their guide elements interdigitating with barrier means extending from the side walls to prevent poultry from being pulled into a space between the front ends of the side walls and the adjacent rotors.

14. A poultry harvester according to claim 13 wherein the barrier means, at least in part, embrace the core portions of the adjacent rotors.

15. A poultry harvester according to claim 14 wherein the barrier means fully embrace the core portions of the adjacent rotors.

16. A poultry harvester according to claim 15 wherein said barrier means are loops made from materials selected from the group consisting of metals and plastics extending around the adjacent rotor cores.

17. A poultry harvester as claimed in claim 12 wherein one said poultry-handling assembly is disposed at the front end of the harvester.

18. A poultry harvester as claimed in claim 17, further comprising a second poultry handling assembly disposed at a back end of the harvester.

19. A poultry harvester as claimed in claim 18, wherein the guide elements of said second poultry handling assembly interdigitate with barrier means which are provided at the back end of the harvester to prevent poultry from being pulled into a space between the side walls at the rear of the harvester and the adjacent rotors.

20. A poultry harvester as claimed claim 19 wherein at least two said poultry-handling assemblies are disposed at the back end of the harvester.

21. A poultry-handling assembly comprising:
first and second rotors arranged side by side mounted for rotation about generally vertical axes, each said rotor having guide elements disposed thereon, said guide elements being arranged in discrete groups spaced apart about the periphery of the rotor so as to define inter-group spaces between adjacent groups on the rotor, said guide elements being flexible fingers which project outwardly from said first and second rotors, said guide elements being arranged in a star-shaped configuration when the rotor is viewed along its axis of rotation, and
drive means for contra-rotating said first and second rotors, whereby upon rotation of said first and second rotors, said guide elements cooperate to gather poultry into the assembly.

22. An assembly as claimed in claim 21, wherein guide elements of opposite sides of each group slant towards one another to produce the points of the star shape and a space between the points.

23. An assembly as claimed in claim 21, wherein each group of elements comprises two or more rows of elements running lengthwise of the rotor.

24. An assembly as claimed in claim 23, wherein each group of elements consists of three said rows.

25. A poultry-handling assembly comprising:
first and second rotors arranged side by side mounted for rotation about generally vertical axes, each said rotor having guide elements disposed thereon, said guide elements being arranged in discrete groups spaced apart about the periphery of the rotor so as to define inter-group spaces between adjacent groups on the rotor, each rotor having three or more groups of guide elements spaced circumferentially around the rotor, and
drive means for contra-rotating said first and second rotors, whereby upon rotation of said first and second rotors, said guide elements cooperate to gather poultry into the assembly.

26. A poultry harvester comprising:
a vehicle having a frame;
first and second rotors arranged side by side mounted on said frame for rotation about generally vertical axes, each said rotor having guide elements disposed thereon, said guide elements being arranged in discrete groups spaced apart about the periphery of the rotor so as to define intergroup spaces between adjacent groups on the rotor,
drive means for contra-rotating said first and second rotors, whereby upon rotation of said first and second rotors, said guide elements cooperate to gather poultry into the harvester,
a conveyor for transferring poultry from the poultry-handling assembly at a front end of the harvester to an end location at a back end of the harvester, and
stationary side walls flanking both sides of said conveyor, the rotors adjacent to the conveyor at the front end of the harvester having their guide elements interdigitating with barrier means extending from the side walls to prevent poultry from being pulled into a space between the front ends of the side walls and the adjacent rotors.

27. A poultry harvester according to claim 26, wherein the barrier means, at least in part, embrace core portions of the adjacent rotors.

28. A poultry harvester according to claim 27, wherein the barrier means fully embrace the core portions of the adjacent rotors.

29. A poultry harvester according to claim 28, wherein said barrier means are one of metal and plastic loops extending around the adjacent rotor cores.

30. A poultry harvester comprising:
a vehicle having a frame; and
first and second poultry handling assemblies mounted on said frame, said first poultry-handling assembly being disposed at a front end of the harvester and said second poultry-handling assembly being disposed at a back end of the harvester, each said poultry handling assembly including:
first and second rotors arranged side by side mounted on said frame for rotation about generally vertical axes, each said rotor having guide elements disposed thereon, said guide elements being arranged in discrete groups spaced apart about the periphery of the rotor so as to define inter-group spaces between adjacent groups on the rotor, and
drive means for contra-rotating said first and second rotors, whereby upon rotation of said first and second rotors, said guide elements cooperate to gather poultry into the harvester,
the guide elements of said second poultry handling assembly interdigitating with barrier means which are provided at the back end of the harvester to prevent poultry from being pulled into a space between the side walls at the rear of the harvester and the adjacent rotors.

31. A poultry harvester as claimed claim 30, wherein at least two said poultry-handling assemblies are disposed at the back end of the harvester.

* * * * *